Aug. 16, 1927.

H. J. PEREIRA

DRAIN PLUG OR VALVE

Filed July 15, 1926

1,638,954

Inventor
Henry James Pereira.
By Adam E. Fisher.
Attorney

Patented Aug. 16, 1927.

1,638,954

UNITED STATES PATENT OFFICE.

HENRY JAMES PEREIRA, OF CHELSEA, MASSACHUSETTS.

DRAIN PLUG OR VALVE.

Application filed July 15, 1926. Serial No. 122,567.

This invention relates to drain plugs or valves and has for its primary object the provision of a drain plug which can be adapted for use in draining the crank case or the radiator of a machine, and can be controlled from the dash board of the said machine.

Another object is to provide a plug which is positive in operation and simple and durable in construction for standing the hard uses to which it is subjected.

Another object is to construct the drain plug in such a manner as to prevent it from being clogged by dirt and grit accumulated on the plug while driving or from grit accumulated in the crank case or radiator.

Other objects and advantages of the device will be apparent from the accompanying drawing and specification.

In the drawing

Figure 1:
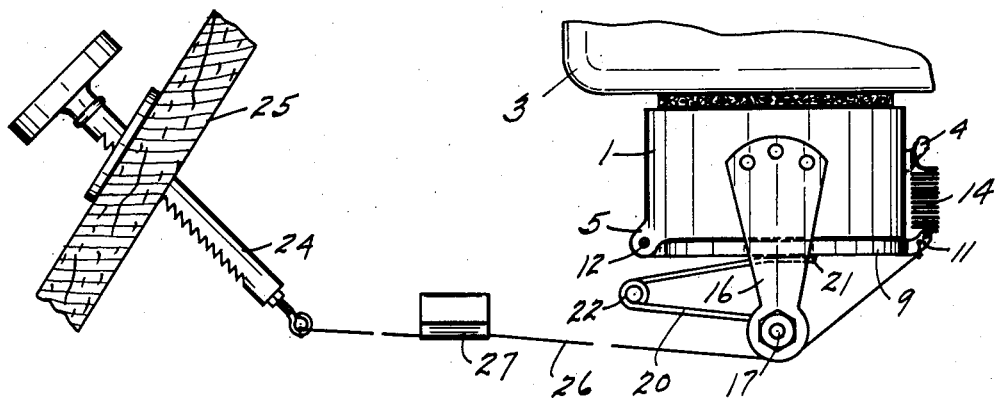
Figure 1 is an elevation of the plug, as secured to the crank case of an automobile and operated from the dash.
Figure 2:
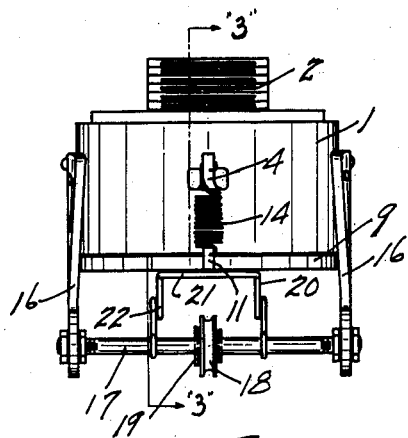
Figure 2 is a front elevation of the drain plug.
Figure 3:
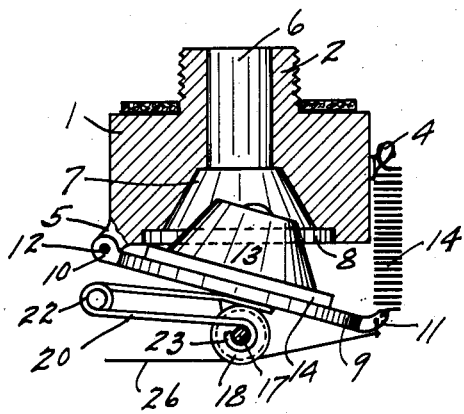
Figure 3 is a section taken on the line "3—3" of Figure 2.
Figure 4:
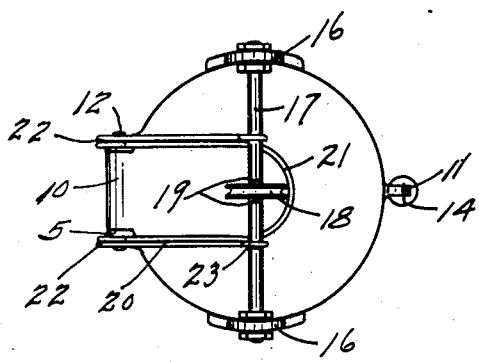
Figure 4 is a bottom plan view of the drain plug.

In constructing and assembling the elements of my invention I provide a plug body 1 formed with a threaded nipple 2 which is adapted to screw into the crank case 3 of an automobile (not shown) in place of the usual drain cock (not shown). The said body 1 has formed upon its periphery an integral finger 4 and hinge lugs 5, the said hinge lugs 5 being formed upon the periphery at an angle of 180° from the finger 4. The said body 1 and nipple 2 have an aperture 6 drilled therein, which terminates in a tapered valve seat 7. The said body 1 is further provided with a counterbore 8 adjacent the valve seat 7. A cap 9 having a hinge lug 10 and an ear 11 formed on its periphery is provided. The said hinge lug 10 alternates with the lugs 5, and the lugs are thus engaged by a common hinge bolt 12. A tapered valve 13 is cushioned upon a resilient gasket 14 and secured upon the inner side of the cap 9, and adapted to engage the valve seat 7 permitting the gasket 14 to engage the counterbore 8. A substantial coil spring 14 is secured to the finger 4 and ear 11 for the purpose of closing the valve. Standards 16 are secured to the body 1 opposite to each other and at angles of 90° to the finger 4. The said standards have a shaft 17 carrying a grooved pulley 18, secured therein, the said pulley being loosely mounted upon the said shaft 17 and held in position by cotter pins 19 passed thru the shaft 17 on either side of the said pulley 18. A double torsion spring 20, formed by bending a piece of spring wire upon itself at 21 and then forming the bent wire with medial coils 22, is provided and has its ends formed with hooks 23 which are adapted to engage the shaft 17 while the bent end 21 is secured to the cap 9.

The drain plug is operated by means of a serrated pull rod 24 passed thru the dash board 25 and connected with a cable 26 passed thru tubular bearings 27 over the grooved pulley 18 and connected to the ear 11. The further operation of the device is apparent from the foregoing description and drawings. This type of drain plug can be used with equal efficiency on a radiator and operated in the same manner.

While I have herein described a certain specific method of constructing and assembling the elements of my invention, it is understood same may be varied in minor details, not departing from the spirit of my invention as defined in the appended claims.

I claim:

1. A drain plug as described, embodying a body formed with a threaded nipple, said body and nipple being provided with an aperture terminating in a valve seat formed in said body; a finger and hinge lugs on the periphery of said body; a cap formed with an ear hinged in said hinge lugs; a valve on said cap for seating in said valve seat; a coil spring engaging said ear and said finger; standards on said body; a shaft journaled thru said standards; a double torsion spring engaging said shaft and said cap; and means for operating said drain plug from the dash board of an automobile.

2. In a drain plug as described, embodying a body having an aperture terminating in a valve seat; hinge lugs on said body; a cap formed with a hinge lug, hinged to said body hinge lugs; a tapered valve, cushioned upon a resilient gasket, secured to said cap for engaging said valve seat; standards secured to the side of said body; a shaft passed thru said standards; a torsion spring engaging said cap and said shaft; and means for securing said body to a crank case or a radiator.

In testimony whereof I affix my signature.

HENRY JAMES PEREIRA.